United States Patent
Tsai et al.

(10) Patent No.: US 6,862,170 B2
(45) Date of Patent: Mar. 1, 2005

(54) SOLID ELECTROLYTIC CAPACITOR AND ITS PRODUCING METHOD

(75) Inventors: Li-Duan Tsai, Hsinchu (TW); Yi-Chang Du, Hsinchu (TW)

(73) Assignee: Industrial Technology Research Institute-Material Research Laboratories, Hsinchu (TW)

( * ) Notice: Subject to any disclaimer, the term of this patent is extended or adjusted under 35 U.S.C. 154(b) by 0 days.

(21) Appl. No.: 10/765,941

(22) Filed: Jan. 29, 2004

(65) Prior Publication Data
US 2004/0184222 A1 Sep. 23, 2004

(30) Foreign Application Priority Data
Mar. 11, 2003 (TW) ........................................ 92105266 A

(51) Int. Cl.[7] ................................................ H01G 9/00
(52) U.S. Cl. ........................ 361/523; 361/525; 252/500
(58) Field of Search .................. 361/523, 525, 361/528–530; 252/500, 62.2

(56) References Cited

U.S. PATENT DOCUMENTS

| 4,609,971 A | 9/1986 | Shaffer |
| 4,803,596 A | 2/1989 | Hellwig et al. |
| 4,864,472 A | 9/1989 | Yoshimura et al. |
| 6,430,032 B2 * | 8/2002 | Sakai et al. .................. 361/523 |
| 6,807,049 B2 * | 10/2004 | Konuma et al. ............ 361/524 |

FOREIGN PATENT DOCUMENTS

| EP | 0 617 442 A2 | 9/1994 |
| JP | 2001-250742 A | 9/2001 |

* cited by examiner

Primary Examiner—Anthony Dinkins
(74) Attorney, Agent, or Firm—Birch, Steward, Kolasch & Birch, LLP

(57) ABSTRACT

A solid-state electrolytic capacitor and its producing method are disclosed. First, a capacitor element containing conducting polymer as the electrolyte sucks non-conjugate polymer precursors solution and the polymeric precursor polymerizes and crosslinks. Therefore, the conducting polymer combines non-conjugate polymer into a kind of interpenetration or semi-interpenetration network polymer material. Finally complete the manufacture of the capacitor by sealing the capacitor, and conducting the age process.

9 Claims, 2 Drawing Sheets

|  | aging process | | | | | reliability test for 1000 hr | | | | |
|---|---|---|---|---|---|---|---|---|---|---|
|  | 120Hz | | 100KHz ESR (mΩ) | leakage current (μA) | yield (%) | 120Hz | | 100KHz ESR (mΩ) | leakage current (μA) | yield (%) |
|  | Capacitance (μF) | ESR (mΩ) | | | | Capacitance (μF) | ESR (mΩ) | | | |
| embodiment 1 | 343 | 98 | 8 | 204.0 | 100 | 344 | 99 | 7 | 2.96 | 100 |
|  | 348 | 102 | 7 | 124.2 | | 348 | 106 | 7 | 28.4 | |
|  | 351 | 105 | 8 | 83.8 | | 354 | 106 | 7 | 8.48 | |
|  | 350 | 102 | 7 | 18.6 | | 350 | 108 | 7 | 3.12 | |
|  | 349 | 111 | 7 | 51.0 | | 342 | 111 | 7 | 4.82 | |
|  | <u>349</u> | <u>119</u> | <u>7</u> | <u>296</u> | | - | - | - | - | |
| embodiment 2 | 353 | 103 | 8 | 32.9 | 80 | 346 | 105 | 8 | 3.32 | 50 |
|  | 353 | 107 | 8 | 57.3 | | 354 | 106 | 8 | 4.08 | |
|  | 357 | 103 | 8 | 37.3 | | <u>6.7</u> | <u>27130</u> | <u>7680</u> | <u>>20000</u> | |
|  | 350 | 121 | 8 | 230 | | <u>345</u> | <u>122</u> | <u>7</u> | <u>481</u> | |

FIG. 2

SOLID ELECTROLYTIC CAPACITOR AND ITS PRODUCING METHOD

This Nonprovisional application claims priority under 35 U.S.C. §119(a) on patent application No(s). 092105266 filed in Taiwan on Mar. 11, 2003, the entire contents of which are hereby incorporated by reference.

BACKGROUND OF THE INVENTION

1. Field of Invention

The present invention relates to capacitors, especially a method that improves the stability and reliability of the solid electrolytic capacitor.

2. Related Art

Since conducting polymers have a higher conductibility than liquid electrolyte fluid or solid organic semi-conducting salt (such as TCNQ complex salt) that are used in the traditional electrolytic capacitor. Therefore, conducting polymers used as solid electrolyte in the electrolytic capacitors can improve the characteristics of electrolytic capacitors, for example, high-frequency response characteristics.

Jesse S. Shaffer et al. first used conducting polymers as electrolyte in the electrolytic capacitor in U.S. Pat. No. 4,609,971 in 1983. The procedure involves dissolving soluble polyaniline powder and $LiClO_4$ into the mixture solution of butyrolactone and water. And then an anode aluminum foil is dipped into the fore-said mixed solution and expels the solvent on the aluminum foil. Since conducting polymers such as polyaniline cannot sink into the holes on the dielectric layer very well, the capacitors show low capacitance and high impedance. Therefore, Tsuchiya et al. in U.S. Pat. No. 4,864,472 suggested forming manganese dioxide layer on the surface of the dielectric layer in the capacitor and then forming a layer of conducting polymers through electrochemical process.

In addition, Gerhard Hellwig, Stegne and his coworkers documented in U.S. Pat. No. 4,803,596 utilizing conductive polymers as the electrolyte for capacitors by chemical oxidative polymerization. This method dips an anode aluminum foil into monomers and oxidant, respestively. And then the monomers are polymerized under the appropriate conditions. The procedure is accomplished repeatedly to accumulate electrolyte of conducting polymers.

Whether by electrochemical or chemical oxidative polymerization, the produced conducting polymers generally show poor mechanical strength; especially the conducting polymers generated by chemical oxidative polymerization are loose and brittle. The poor mechanical strength of conducting polymer as the electrolyte of capacitors may cause the failure of capacitors, because the conducting polymer in the capacitors are easily broken by outside force during manufacturing, transporting and the usage of the capacitors. Also, the loose structure of conducting polymers implies that the structure stability of conducting polymers at higher temperature is poor. Therefore, after long usage, the conducting polymers can easily separate from the anode and cathode of the capacitor and the capacitor fails finally.

Therefore, improving mechanical strength and structure stability of the polymer electrolyte is an important issue for the development of a solid electrolyte capacitor.

Japan Patent 2001250742 discloses that glass fiber is added into the conducting polymers in the solid electrolyte capacitors to improve the mechanical strength of the electrolyte layer of the capacitor. However, the interface strength between glass fiber and conducting polymer is poor, so the effect of glass fiber strengthening the conducting polymer is not observed. Further more, adding insulated glass fiber into conducting polymer results in the decline of the bulk conductivity of the solid electrolyte.

Europe Patent 0617442 discloses a kind of composite conducting polymer electrolyte. The inventors suggested adding polymer with functional group of carboxylic acid or hydroxyl to electrolytic solution containing conducting polymer monomer and electrolyte and then the linear polymer combined conducting polymer into the said composite conducting polymer, when conductive polymer monomer converts into conducting polymer by electrochemical synthesis. The said composite conducting polymer electrolyte can be attached to the anode surface of the capacitor very well, and has good physical properties, so the reliability of the capacitor is promoted. However, this method can only use soluble linear polymers, and the thermal stability of linear polymer blend of conductive conjugative polymers is lower than the cross-linked polymers. At the same time, before adopting this method, the compatibility between linear polymers and conducting polymer needs to be concerned, to avoid phase separation in high temperature.

SUMMARY OF THE INVENTION

The invention provides a solid capacitor and a method for producing a solid capacitor with the characteristics of heat stability and excellent reliability. The method disclosed by this invention includes: first, form the conductive polymer layer between the anode and cathode of the capacitor element; the capacitor element sucks non-conjugative polymer precursor or monomer solution and then the monomer or precursor polymerizes or crosslinks. As a consequence, the conducting polymer combines the non-conjugate polymer into an interpenetration or semi-interpenetration network of conductive compound between the anode and cathode of the capacitor. After sealing the capacitor and conducting the aging procedure, the solid state capacitor is produced completely.

The method of the invention provides a kind of interpenetration or semi-interpenetration network polymer compound as the electrolyte of the electrolyte capacitor As a result, the characteristics of the heat stability and reliability of the solid state capacitor are promoted.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given in the illustration below only, and thus are not limitative of the present invention, and wherein:

FIG. 2 illustrates the characteristics and the result of the accelerated reliability test of the embodiments 1 and 2.

DETAILED DESCRIPTION OF THE INVENTION

Figure 1:
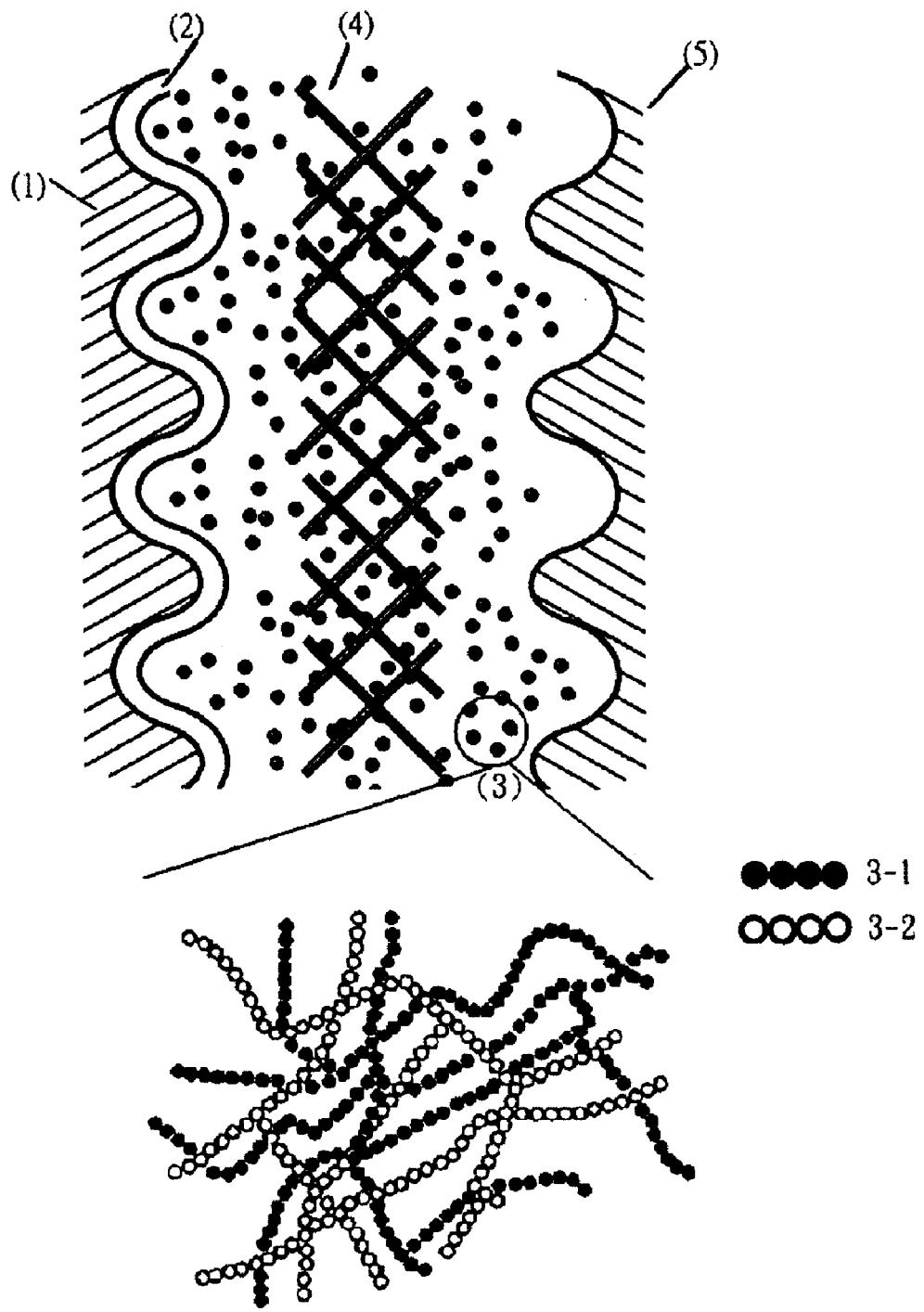
FIG. 1 illustrates the structure of the capacitor of the invention.

The solid electrolyte capacitor in this invention includes the electrolyte forming in the space between the anode and cathode of the capacitor, as illustrated by FIG. 1 in the structure diagram of the capacitor. The figure shows the relative position of the following components: anode aluminum 1, aluminum oxide dielectric layer 2, polymeric electrolyte 3, paper 4, and cathode aluminum 5. Intertwining, the polymeric electrolyte is composed of conducting polymers 3-1 and non-conjugate polymers 3-2. The non-conjugate polymer combines the conducting polymer into an interpenetration or semi-interpenetration network polymer compound. This kind of electrolyte infiltrates the space between the paper fibers, and the space between the anode and cathode and any spaces in-between. The conducting polymers are conjugate conducting polymers, and chosen from thiophene, pyrrole, aniline, or derived from the three. The non-conjugating polymer is converted from polymeric precursor or monomer containing any functional groups of epoxy, hydroxyl or carboxyl. The solid-state electrolyte capacitor can possess both the characteristics of stable physical structure and heat stability, with the said polymer compound as the electrolyte.

The invention discloses a production method of the solid electrolyte capacitor. It starts with forming loose and multi-aperture conducting polymers between the anode and cathode of the capacitor element. Soak the capacitor element in the prepared non-conjugate polymeric precursor or monomer solution, and the polymeric precursor or monomer solution infiltrates the loose conducting polymers. Then induce the polymerization or crosslinking reactions of non-conjugate polymeric precursor or monomer. Finally, the non-conjugate polymer combines conducting polymer into an interpenetration or semi-interpenetration network structure. The capacitor element is then put into an aluminum cover and sealed by rubber and conducts the aging process to reduce the leakage current of the capacitor. This polymer compound possesses both properties of original conducting polymer and conjugate polymer such as conductivity, and good structural strength.

Embodiment 1

An anode aluminum foil, a cathode aluminum foil and Manila paper are wound together to prepare an capacitor element. The element is impregnated in a mixture solution composed of EDT monomer, Fe(III) tosylat solution. The capacitor element sucking the mixture solution is heated at 100° C. for 10 minutes. After impregnation and polymerization, the capacitor element is cleaned up with methanol and dried. The capacitor element is then impregnated in an epoxy resin solution. To allow the epoxy precursor to be able to infiltrate the loose conducting polymer well, the epoxy precursor can be diluted with acetone or any other good solvent to reduce the viscosity of the non-conjugated monomer or precursor as low as possible.

The capacitor element sucking the epoxy resin is then placed in a high temperature environment to repel the solution and the epoxy resin cross-links. Then the capacitor element is set into an aluminum metallic case and sealed with a rubber member. After aging process is completed, a winding type aluminum solid state electrolytic capacitor is produced.

Embodiment 2

An anode aluminum foil, a cathode aluminum foil and Manila paper are wound together to prepare an capacitor element. The element is impregnated in a mixture solution composed of EDT monomer, Fe(III) tosylat solution. The capacitor element sucking the mixture solution is heated at 100° C. for 10 minutes. After impregnation and polymerization, the capacitor element is cleaned up with methanol and dried. Then the capacitor element is set into an aluminum metallic case and sealed with a rubber member. After aging process is completed, a winding type aluminum solid state electrolytic capacitor is produced.

The capacitors of embodiments 1 and 2 are charged with 10V at 105° C., to undergo an accelerated reliability test. The characteristics and the result of the accelerated reliability test are shown in FIG. 2.

The capacitor, using the process introduced by this invention, has the following results. After charged for one minute, the current leakage is less than 250 $\mu$A. The capacity for 120 Hz is greater than 330 $\mu$F. The equivalent series resistance (ESR) is less than 150 m$\Omega$. The reliability test is conducted at 105° C. After running 1000 hours by applying a rated voltage of DC 16V, the variation of capacity is less than 10%.

From the result described in FIG. 2, even though the capacitor following the embodiment 2 procedure has similar equivalent series resistance at 120 Hz as the capacitor in the embodiment 1. The capacitors produced using the embodiment 2 have a worse production ratio, and half of the capacitors have an extraordinary high leakage current. After the reliability test is conducted for 1000 hr, the ratio of available capacitors is at only 50%.

Reading the invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A solid electrolyte capacitor comprising:
   a capacitor element having a anode and a cathode; and
   a electrolyte being a conducting compound formed by interactions between a conducting polymer and a non-conjugate polymer and filling between the anode and the cathode.

2. The solid electrolyte capacitor in claim 1, wherein said the conducting compound having an interpenetration network structured conducting compound.

3. The solid electrolyte capacitor in claim 1, wherein said the conducting compound having a semi-interpenetration network structured conducting compound.

4. The solid electrolyte capacitor in claim 1 wherein said the conducting polymer is a conjugate conducting polymer selected from the group consisting of thiophene, pyrrole, aniline and derivative polymers from these three compounds.

5. The solid electrolyte capacitor in claim 1 wherein said the conducting polymer is poly(3,4-ethylenedioxythiophene).

6. The solid electrolyte capacitor in claim 1 wherein said the non-conjugate polymer is a polymer with a functional group selected from the group consisting of epoxy, hydroxyl and carboxyl.

7. The solid electrolyte capacitor in claim 1 wherein said the non-conjugate polymer is a synthesized from precursor group with a functional group selected from the group consisting of epoxy, hydroxyl and carboxyl.

8. The solid electrolyte capacitor in claim 1 wherein said the non-conjugate polymer is synthesized from monomer with a functional group selected from the group consisting of epoxy, hydroxyl and carboxyl.

9. The solid electrolyte capacitor in claim 1 wherein said the capacitor element is surrounded by a layer of non-conjugated polymer layer.

* * * * *